United States Patent [19]

Irvin

[11] 3,760,270

[45] Sept. 18, 1973

[54] CIRCUIT ARRANGEMENTS FOR MEASURING THE INSTANTANEOUS PHASE DIFFERENCE BETWEEN TWO SIGNALS

[75] Inventor: James Ledson Irvin, Walton-on-Thames, England

[73] Assignee: Redifon Limited, London, England

[22] Filed: May 21, 1971

[21] Appl. No.: 145,800

[30] Foreign Application Priority Data
May 28, 1970 Great Britain.................. 25,750/70

[52] U.S. Cl............................................. 324/83 D
[51] Int. Cl. ...................... G01r 25/00, H03d 13/00
[58] Field of Search........................... 324/83, 83 D; 235/92 PS; 328/133, 134

[56] References Cited
UNITED STATES PATENTS
3,209,254  9/1965  Hossmann....................... 324/83 D
3,416,083  12/1968  Ray................................. 324/83 D
3,512,085  5/1970  Peterson et al.................. 324/83 D

OTHER PUBLICATIONS
Moore, IBM Tech. Dis. Bul. July 1960. p. 35.

Primary Examiner—Alfred E. Smith
Attorney—Larson, Taylor & Hinds

[57] ABSTRACT

A circuit arrangement for measuring the phase difference between a received radio signal pulse and a locally-generated reference pulse, particularly for use in a hyperbolic navigation system receiver, by measuring the number of clock pulses occurring between a pair of signal and reference pulses and averaging a number of such counts to reduce phase error due to random noise. The ambiguity arising from averaging clock pulse counts for pulses with phase difference in the 0°, 360° region is avoided by the use of circuit elements including a four-state gate, two states of which relate to the normal sequence of alternate signal and reference pulses, to start and stop clock pulse counts, and the other two states of which relate to abnormal sequences of two successive signal pulses or two successive reference pulses, due to random noise phase errors, whereupon double upward counting and single downward counting of clock pulses is initiated, respectively.

9 Claims, 6 Drawing Figures

TABLE 1
Table of states of Four-state Gate and corresponding Main Counter control

| Condition | Pulse | Flip-Flop 12 Q.Outpt. | Flip-Flop 19 Q.Outpt. | FSG State | Counter Gate Opened | Main Counter Control |
|---|---|---|---|---|---|---|
| Normal (Noise-free) | Sig. | 0 | 1 | 2 | 2 | Up count Normal (C.P) |
| | Ref. | 1 | 0 | 1 | — | Stop Count |
| Noise present | Sig+Sig. | 1 | 1 | 3 (from state 2) | 3 | Up Count double (C.P+D.C.P) |
| | Ref+Ref. | 0 | 0 | 0 (from state 1) | 0 | Down count Normal (C.P.) |

CIRCUIT ARRANGEMENTS FOR MEASURING THE INSTANTANEOUS PHASE DIFFERENCE BETWEEN TWO SIGNALS

This invention relates to electrical circuit arrangements for measuring the instantaneous phase difference between two signals.

The measurement of the phase difference between two signals, of which one may be received from a remote source of known location and the other may be generated locally, with a receiver located in a moving craft, is one requirement in navigation by a hyperbolic or like navigation system and the circuit arrangement of the present invention has particular application to radio receivers for use with such a navigation system. Accordingly, the invention will be described herein with reference to such use.

The remote signal is invariably received with superimposed random noise, which randomly shifts the apparent phase of the signal relatively to a reference signal which being locally generated, is not normally subject to noise of much magnitude. The random phase shift may be positive or negative and, over a sufficiently long period, will be as much positive as negative. Hence, a known technique in such measurement is to average the phase difference values found by a number of successive measurements. This technique significantly reduces the effect of random error.

However, a further problem arises in cases where the random error produces phase shift above and below the 360° – 0° point. For example, if random noise provides a phase error of ±5°, then the succession of measurements to be averaged will lie between 355° and 5°, giving an average value of 180°, which is a gross error.

The object of the present invention is to provide an improved circuit arrangement for measuring the phase difference between two signals, having regard to the disadvantage referred to above.

Accordingly, the present invention provides a circuit arrangement for providing a digital measurement of the instantaneous phase difference between first and second recurrent signals including a generator of clock pulses of a higher order of frequency than the said recurrent signals, means for examining the first and second signals in pulse form and measuring the interval between corresponding pulse parts of successive signals, one being a first signal pulse and the other a second signal pulse and means for measuring the number of clock pulses occurring in each said interval and summing the said count over a number of said intervals, whereby said clock pulse count for said number of said intervals, for conditions of near-coincidence of said successive signals, is kept either uniformly high or uniformly low.

In order that the invention may be more fully understood and readily carried into practice, two embodiments thereof will now be described in detail, by way of example, with reference to the accompanying drawings, of which.

In the navigation system to which the apparatus of FIGS. 1 to 5 relates, radio signals of very low radio frequency are transmitted sequentially in time from a number of geographically spaced-apart transmitters. The geographical location of a craft, with reference to the positions of any two transmitters, is determined by measuring the phase difference between the received signals from the two transmitters selected. The location obtained lies on a parabola. A second such measurement, using signals from a second pair of transmitters, gives a navigational fix at the intersection of the two parabolae concerned.

Since, as stated, the transmitted signals occur sequentially, the phase difference between any two signals is ascertained by first determining the phase relationship of each of the selected pair of signals relatively to a locally-generated reference signal.

In the system to be particularly described, the transmitted signals are unmodulated carrier signals at 10.2 kH. A radio receiver including a local heterodyne oscillator is used to provide a beat-frequency output signal at 1.0 kH. The local reference oscillator also provides a 1.0 kH signal.

In the system to be described, the sinusoidal signal of 1.0 kH is converted into a 1.0 kH pulse signal, the instant when the sine wave crosses zero amplitude, in the positive-going sense, defining the pulse wave front.

If the reference signal is initially sinusoidal, it is similarly converted into a 1.0 kH pulse signal.

The phase difference between the incoming and reference signals is then defined by the interval between either an incoming signal pulse wave front and the next reference signal pulse wave front, or a reference signal pulse wave front and the next incoming signal pulse wave front.

In the system to be described, the interval between incoming signal and reference pulses is measured.

In order to give a digital measurement of phase, which is desired because subsequent position computation is performed by an ancilliary digital computer, the number of 200 kH clock pulses occurring during this interval is measured. Thus, a clock-pulse count of 0 or 200 defines coincidence of the incoming and reference signals.

The clock-pulse count is made by a main counter into which output signals from the apparatus of the invention are fed and which, in turn, feeds the ancilliary digital computer.

It will readily be appreciated that the 0°, 360° averaging ambiguity referred to earlier exists equally with a clock pulse count of "200" as with a degree count of "360."

It will be equally readily appreciated that the ambiguity can be avoided, in the case of the ±5° phase error introduced by random signal noise referred to earlier, if the phase difference values to be averaged were measured between 355° and 365°. Alternatively, they might be measured between −5° and +5°.

The present invention is based upon the realisation that, in a repetitive, digital, phase-measuring system, in the critical region immediately above and below coincidence, the successive phase difference pulse counts must be kept either uniformly high or uniformly low, or both. This is achieved in the phase measuring method to be described.

It will facilitate subsequent understanding of the operation of the invention to explain now that such a method of counting is effected by controlling the count of the main counter by what is referred to herein as a "four-state gate."

This four-state gate (FSG) includes two flip-flops together defining four steady states identified as states 0, 1, 2, and 3. In the absence of signal noise, only two of these states would be needed, namely, state 2 (as it is arbitrarily chosen to be) which controls the upward count of clock-pulses by the main counter and state 1 which stops the count.

There is obviously a counter reset control between counts, but with this control we are not here concerned.

The four-state gate state 0 additionally provides for the downward count of the main counter and state 3 provides for double upwards count, both for purposes which are later explained.

Figure 1:
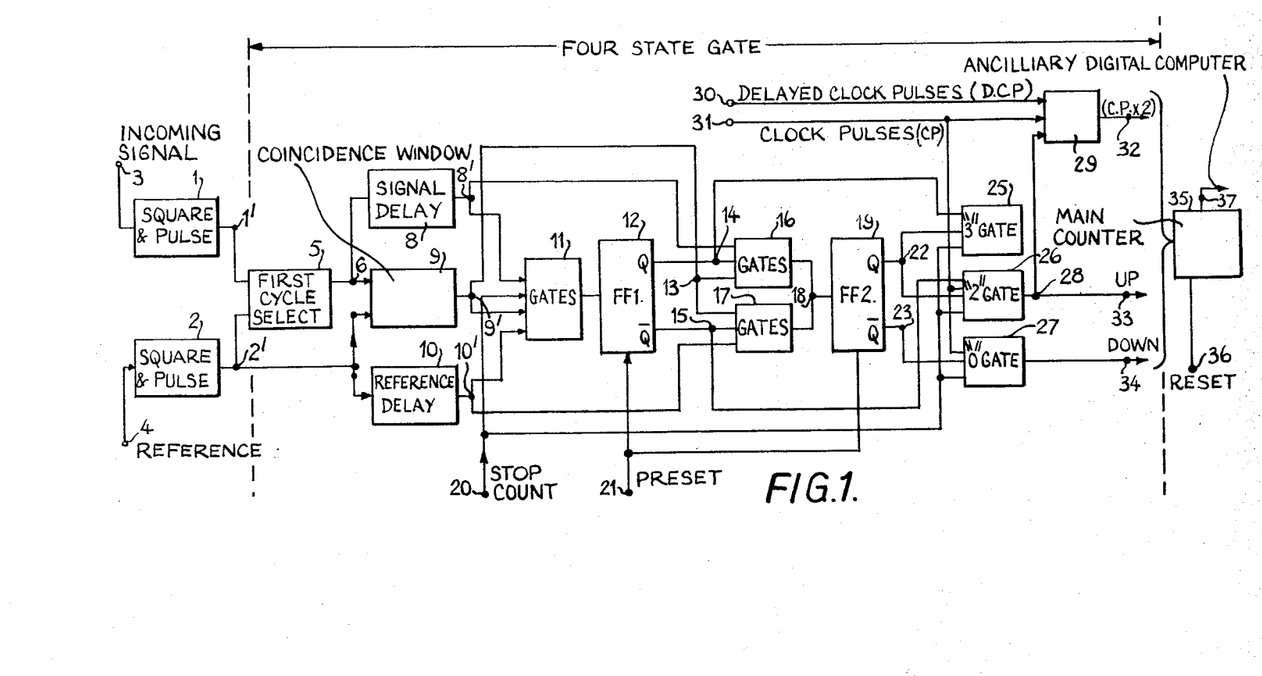
FIG. 1 is a block diagram of a signal phase difference phase measuring circuit employing a four-state gate.
Figure 3:
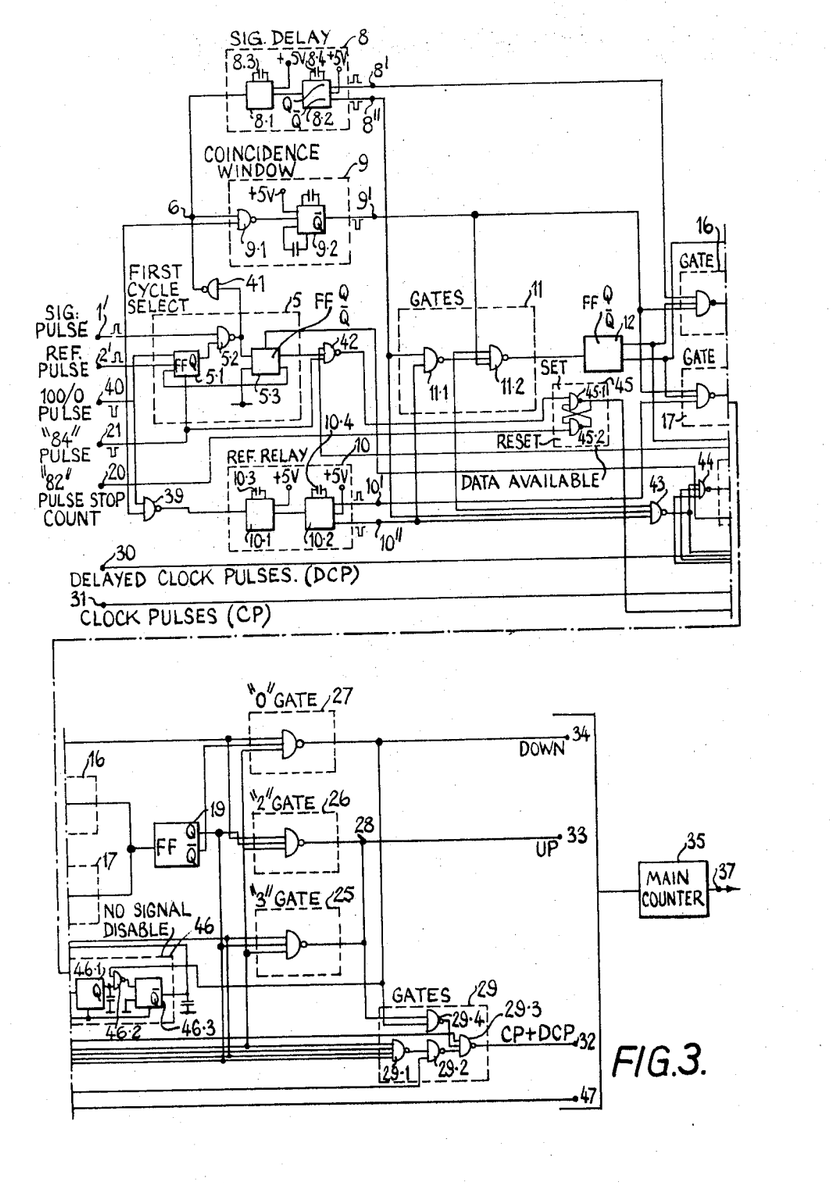
FIG. 3 is a circuit diagram of the four state gate of FIG. 1.

Referring, now, to the block diagram of FIG. 1, a first embodiment of the invention comprises incoming signal and reference signal input terminals followed each by squaring and pulse-forming units, the apparatus comprising the four-state gate referred to, lying between the vertical broken lines in the figure and shown in greater detail in the circuit diagram of FIG. 3, and the main counter controlled by the four-state gate itself followed by a digital computer.

More particularly, the incoming sinusoidal signal at beat-frequency 1 kH is fed to terminal 3 and converted into pulse form by the square and pulse unit 1.

The sinusoidal reference signal at frequency 1 kH is fed to terminal 4 and converted into pulse form by the square and pulse unit 2.

The function of the apparatus of FIG. 1 is to provide a digital measurement of the phase difference between the incoming signal pulses at terminal 1' and the reference pulses at terminal 2'. As stated, this measurement is effected by counting the number of 200 kH clock pulses occurring between an incoming signal pulse front and the next following reference pulse front. In fact, 82 such counts are made to provide a sum which is substantially free of random signal noise error.

Until both signal and reference pulses are present in alternate sequence, no counting operation is required. Accordingly, both signal and reference pulses are fed to a first cycle select unit 5.

First cycle select unit 5 is opened by any reference pulse for an interval of 1 mS. If an incoming signal pulse is received during this 1 mS interval, the first cycle select unit is locked open for a multiple count interval of 84 mS, during which the said 82 counts are made and summed. The signal pulses then appear at output terminal 6 during this multiple count interval. The reference pulses continue to be available at terminal 2'.

Also, no count is made if the signal and reference pulses are exactly coincident. To detect this state, signal pulses from terminal 6 and reference pulses from terminal 2' are both fed to a coincidence window unit 9.

Coincidence window unit 9 detects coincidence of signal and reference pulses within about 2µS. Signal and reference pulse overlap within this interval closes the coincidence window unit 9, at output terminal 9', for a period of 2µS. If coincidence is detected, neither pulses appear at output terminal 9', so that subsequent gates 11, 16 and 17 are disabled. If coincidence is not detected subsequent gates 11, 16 and 17 are all enabled.

In order that this disable/enable control of gates 11, 16 and 17 can be effected before the arrival at these gates of the actual signal and reference pulses, the signal and reference pulses are subjected to exactly equal delay by signal delay unit 8 and reference delay unit 10, respectively. Delayed signal pulses and delayed reference pulses appear at output terminals 8' and 10', respectively, from which terminals both pulses are supplied to the gates 11, 16 and 17.

Gate 11, when enabled by an enabling pulse at terminal 9', passes both signal and reference pulses to a first flip-flop 12, which is the first of the two flip-flops together defining four states, referred to earlier. Gate 11 continues to pass both signal and reference pulses until disabled by a stop-count pulse, after the multiple count interval of 82 mS, at terminal 20.

Flip-flop 12 has opposite outputs Q and $\bar{Q}$ at terminals 14 and 15, respectively. That is, when output Q is 1, output $\bar{Q}$ is 0 and vice versa. Flip-flop 12 is preset to Q output 1 by a preset pulse at terminal 21, which preset pulse occurs at multiple count time 84 relative to the previous count, that is at count time 2 after the last stop-count pulse at terminal 20. Each successive signal or reference pulse into flip-flop 12 changes its state.

The zero reference pulse is removed from the input to the coincidence window 9 and from the subsequent units of the four state gate by an AND gate described with reference to FIG. 3. The first pulse entering flip-flop 12 is thus a signal pulse which sets flip-flop 12 to Q output 0. The next following reference pulse sets flip-flop 12 back to Q output 1.

Enabling pulses from coincidence window output terminal 9' appear also at terminal 13 from which they are applied to gates 16 and 17.

Gate 16 receives the delayed signal pulses from output terminal 8'. If enabled by a pulse at terminal 13, and when flip-flop output at terminal 14 is 1, gate 16 passes the delayed signal pulses to terminal 18.

Gate 17 receives the delayed reference pulses from output terminal 10'. If enabled by a pulse at terminal 13, and when flip-flop output at terminal 15 is 1 (output Q is 0), gate 17 passes the delayed reference pulses to terminal 18.

Pulses at terminal 18 are fed to flip-flop 19, which is the second of the pair of flip-flops together defining the four states referred to.

Flip-flop 19 similarly has opposite outputs Q and $\bar{Q}$ at terminals 22 and 23, respectively. When Q output at terminal 22 is 1, $\bar{Q}$ output at terminal 23 is 0 and vice versa. Flip-flop 19 is preset to Q output 0 by a preset pulse at terminal 21.

The first pulse, which by reason of elimination of the zero reference pulse is a signal pulse, and which it will be recalled set flip-flop 12 output Q to 0, now enters flip-flop 19 to set its output Q to 1. The next following reference pulse sets flip-flop 19 back to Q output 0.

The foregoing description describes the recurrent sequence of states of flip-flops 12 and 19 in the absence of signal noise.

With the presence of signal noise, however the instant when the sinusoidal incoming signal crosses zero, may be advanced or delayed. Since this instant defines the instant of the corresponding signal pulse front, this front similarly may be advanced or delayed. In circumstances where the signal and reference pulses are nearly coincident, being separated by an interval less than the random displacement of the signal pulses due to noise, either two signal pulses in succession may occur or two reference pulses in succession may occur.

It will now be appreciated from the foregoing description that flip-flop 12 derives signal and reference input pulses indiscriminately from gate 11 whereas flip-flop 19 derives its signal and reference input pulses discriminately from the signal channel by way of gate 16 and from the reference channel by way of gate 17, respectively. Hence, a second signal pulse in sequence or a second reference pulse in sequence will change over the state of flip-flop 12 but will leave the state of flip-flop 19 unchanged.

Three main counter control gates 25, 26 and 27 respectively define three of the four states of the four-state gate, identified as states 3, 2 and 0, respectively. State 2 is the normal forward count condition. State 1 is the normal stop-count condition and hence requires no corresponding control gate. State 3 is a double-rate forward count condition and state 0 is a reverse count condition.

The conditions: Normal and Noise, the pulse sequence conditions, the output states of flip-flops 12 and 19, the identifying condition of the four-state gate and the corresponding main counter gate which is opened are all shown in FIG. 6(Table I) which is appended hereto together with the accompanying drawings.

To provide the double forward count referred to, a gate 29 has a 200 kH clock pulse input at terminal 30. A delay unit, not shown in the figure, provides a succession of delayed clock pulses, interdigitated with the clock pulses, which are supplied to terminal 31. When gate 29 is enabled by an output from 3 gate 25, both clock pulses and delayed clock pulses are passed to output terminal 32, there providing a 400 kH pulse train.

Both the 2 gate 26 and the 0 gate 27 receive an input of clock pulses from terminal 31. When open in the manner described, the 2 gate 26 supplies clock pulses to terminal 33 for the forward (UP) counting of main counter 35.

Similarly, when the 0 gate 27 is open, clock pulses are supplied to terminal 34 for the reverse (DOWN) counting of main counter 35.

All pulse outputs from the counter control gates, made available at terminals 32, 33 and 34, are supplied as input pulses to the main counter 35.

The main counter 35 is reset after each multiple counting interval by a reset pulse at terminal 36. The count output of counter 35, at terminal 37, is fed to the ancilliary digital computer referred to earlier but not shown in the drawings.

It will be appreciated from the foregoing description that 82 successive clock pulse counts, representing 82 successive measurements of instantaneous phase-angle difference subject to random noise error, are summed by the main counter 35. No averaging operation is in fact necessary because the digital computer accepts the summation of 82 measurements as the required phase-angle data. It will be understood that the summation count equally avoids the random noise error of individual counts and that if it were in fact averaged, the average count would closely agree with a single noise-free count.

Figure 4:
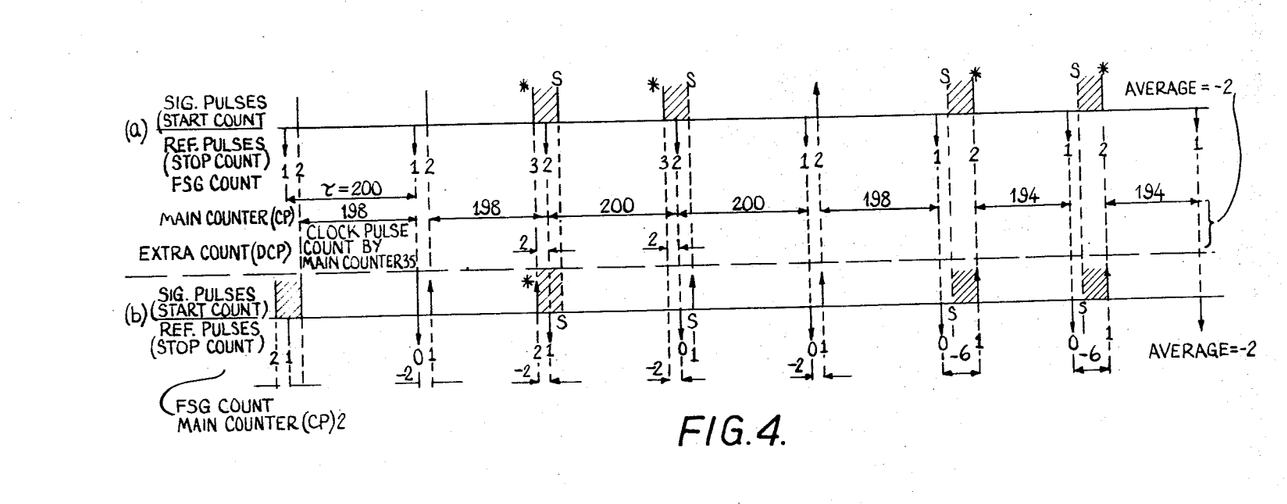
FIG. 4 is a diagram descriptive of the operation of the four-state gate of FIG. 1.

The principle of operation of the invention is illustrated by two examples, identified as (a) and (b), to which the pulse diagram of FIG. 4 relate. Both examples relate to the embodiment of the invention described with reference to FIG 1, in that the clock pulse frequency is 200 kH and the interval is measured between a signal pulse and the next following reference pulse. A complete counting cycle, between consecutive reference pulses, is defined as $\tau = 200$ clock pulse intervals.

In FIG. 4, signal pulses are represented by vertical arrows above a base line and reference pulses are represented by vertical arrows below that base line.

In both examples, signal and reference pulses are separated, in the absence of noise, by an interval corresponding to 2 clock pulses, the reference pulse occurring before the signal pulse.

In both examples, two instances are shown where noise results in a premature signal pulse, the time advance corresponding to 4 clock pulses, that is, the premature signal pulse occurs 2 clock pulses before the reference pulse instead of 2 clock pulses afterwards.

It will be appreciated that signal noise is a random phenomenon and that, over a statistical number of signal pulses, it will result in as many delayed pulses as advanced pulses. Consequently, two delayed signal pulses, corresponding to the two advanced signal pulses, are shown in each example. In fact, as will be seen, equal numbers of advanced and delayed pulses must be considered in any example taken for the average to equal the normal, noise-free count.

In FIG. 4, all the displaced signal pulses are indicated by (*). In each such case of a displaced signal pulse, the normal, that is noise-free, location is indicated by a broken line referenced "S." The extent of time displacement, equal to 4 clock pulses in the instances chosen, is shown by the width of the shaded area between the (*) and "S" lines.

The numerals on the broken lines extending below the signal and reference pulse arrows identify the state of the four-state gate resulting from the pulse concerned.

It will be noted that each signal pulse changes the four-state gate to its next higher numbered state, whereas each reference pulse changes the four-state gate to its next lower numbered state.

The numerals associated with the horizontal arrow lines indicate the magnitude of the main counter count during the interval indicated.

Example (a) illustrates a case where the main counter count is kept uniformly high. Example (b) illustrates a case where the main counter count is kept uniformly low.

Example (a) considers the change of state of the four-state gate, and the resulting pulse count starting with a reference pulse. This example considers signal pulses in the following sequence: two noise-free pulses; two premature pulses, one noise-free pulse, two delayed pulses.

Example (b) considers the change of state of the four-state gate, and the resulting pulse count starting with a (premature) signal pulse. This example considers signal pulses in the following sequence: one premature pulse, one noise-free pulse, one premature pulse, two noise-free pulses, two delayed pulses.

Considering, now, Example (a) in detail, a preset pulse sets the four-state gate to state 1, which corresponds to a STOP count control to main counter 35. The first pulse is a noise-free signal pulse 2 clock pulse intervals from time "zero." This pulse opens the 2 state gate 26 to control main counter 35 for UP counting of clock pulses at the normal (200 kH) rate. The next pulse is a reference pulse defining the end of the first counting cycle of 200 clock pulse intervals and provides a STOP count control to the main counter. Since the signal pulse occurred 2 clock pulse intervals after the first reference pulse, the main counter count, defining the remainder of the 200 clock pulse counting cycle, is 198, as shown.

The next counting cycle provides the same count of 198 between signal and reference pulses. However, this time a premature signal pulse has been received, constituting two signal pulses in succession. This pulse has therefore set the four-state gate to its next higher state that is to state 3, thereby initiating the extra count of 2, due to the delayed clock pulses. These extra counts are shown on a lower line in FIG. 4. The reference pulse, setting the four-state gate to its next lower numbered state, resets it to state 2 thereby controlling the main counter 35 to continue counting at the normal rate.

Thus, in the next counting cycle, the main counter counts for the whole cycle, that is a count of 200. In addition, a premature signal pulse again initiates state 3 and an extra count of 2 is made.

Again, the four-state gate is returned to state 2 by the reference pulse, so that the main counter again counts from the beginning of the counting cycle, giving a count of 200.

The next pulse, a reference pulse, sets the four-state gate to its next lower numbered state, that is to state 1, which corresponds to a STOP count control of the main counter.

The next pulse, a noise-free signal pulse, sets the four-state gate to state 2 and initiates the next count at normal rate, until the following reference count returns the four-state gate to state 1 and stops the counting at a count of 198.

The next pulse, a delayed signal pulse, initiates counting 4 clock pulses late and the resultant count is 194, therefore.

The final counting cycle provides a similar count of 194.

The main counter 35 will, by this time have summed the counts: 198 + (198 + 2) + (200 + 2) + 200 + 198 + 194 + 194 as seven counts of the 82 counts of its multiple counting cycle. However, it will be noted that the sum of the 7 cycles is 1,386 clock pulses (including the 4 delayed clock pulses) and that the average over these 7 cycles is 198, which is the count for noise-free signal pulses.

Example (b) has been chosen to illustrate the case in which the normal state 1 of the four-state gate, resulting from a preset pulse, is set to the next lower numbered state, that is state 0, by a subsequent reference pulse. Since the reference pulses are not subjected to displacement by noise, this example postulates an initial premature signal pulse, as shown.

Each signal pulse changes the four-state gate to its next higher numbered state; each reference pulse changes the four-state gate to its next lower numbered state.

It will be remembered that the main counter 35 is a reversible counter and that the reverse (DOWN) count is initiated when 0 gate 27 is open.

Thus, in the 7 counting cycles of Example (b), the summation of the counts is:

$$2 - 2 + 2 - 2 - 2 - 6 - 6 = -14$$

the average is −2, therefore.

This value of −2 represents the same phase difference as the count of 198, but the ambiguity has been avoided, throughout the summation, by summing only counts which are uniformly high, as in Example (a), or uniformly low, as in Example (b).

It is believed that the circuitry of the block diagram of FIG. 1 will readily be realised, in terms of circuit elements, by one skilled in the art. Nevertheless, to facilitate the prcatical realisation of the invention, the circuitry will be more fully described with reference to the circuit diagrams of FIGS. 2 and 3 which show, respectively, the units 1 and 2 and the four-state gate of FIG. 1 and wherein the units shown in FIG. 1 are identified by the same reference numerals.

Figure 2:
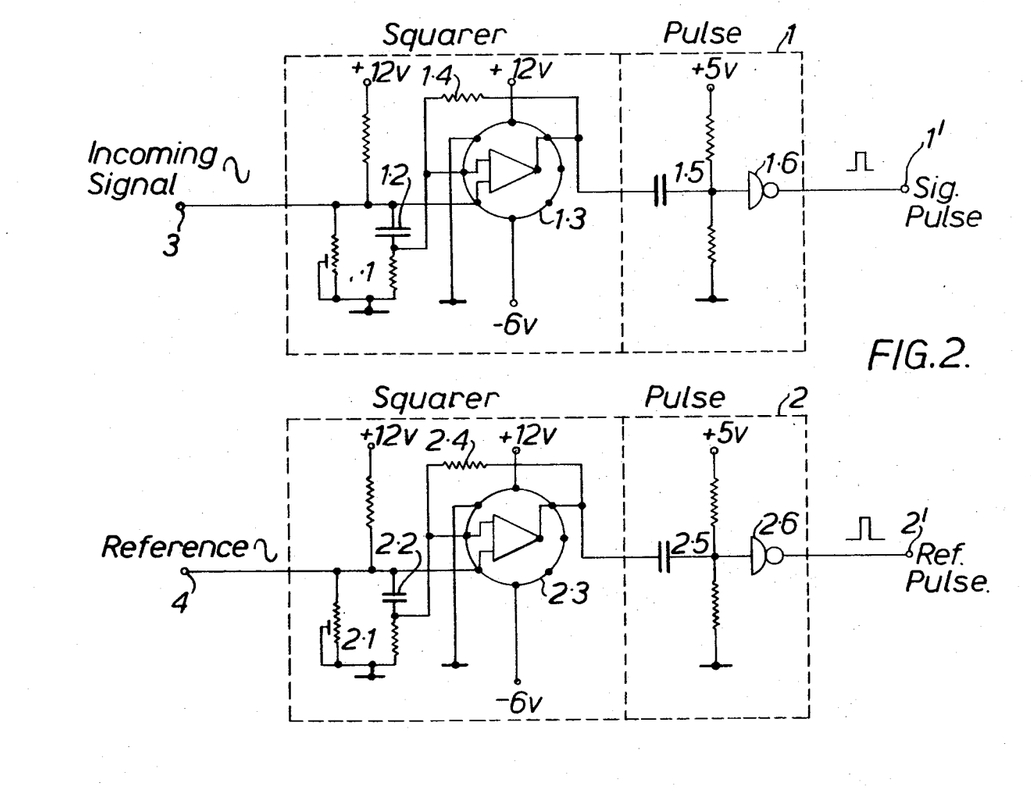
FIG. 2 is a circuit diagram of the signal squaring unit of FIG. 1.

Referring, first, to FIG. 2, it will be noted that, in this example, both the incoming signal and the local reference signal are initially in sinusoidal form, so that units 1 and 2 are of the same circuit form, serving to convert the sinusoidal waves into pulse form.

The unit 1 comprises squaring unit having a resistor-capacitor network 1.1, including capacitor 1.2, to provide a signal to amplify 1.3 having a sharply rising front as the signal sinusoidal wave passes zero amplitude. The amplifier 1.3 is provided with a feedback path 1.4. A following pulse unit comprises a resistor-capacitor network 1.5 feeding gate 1.6. Positive-going output pulses are thus supplied to output terminal 1'.

In the reference channel, sinusoidal waves, at input terminal 4, are similarly converted to positive-going pulses at output terminal 2'.

Referring is next made to the four-state gate circuit arrangement shown in FIG. 3, wherein the terminals 1' and 2', referred to above, are shown as pulse input terminals.

Both signal and reference pulses are supplied to the first cycle select unit 5. At an arbitrary multiple-count starting point, a 100/0 pulse at terminal 40 is supplied to a flip-flop 5.1. The 100/0 pulse is derived by a divider from the reference pulse train, thus, one reference pulse is always conicident with the 100/0 pulse. Reference pulses are supplied to the trigger terminal of flip-flop 5.1. The reference pulse coincident with the 100/0 pulse sets the flip-flop Q output to 1 thereby enabling a gate 5.2. In the absence of a signal pulse, the next reference pulse resets the flip-flop Q output to 0 thus disabling gate 5.2. This process is repetitive after the next 100/0 pulse. When a signal pulse appears at gate 5.2, during the time it is enabled, the signal pulse is passed to a flip-flop 5.3, the Q output of which is thereby set from state 0 to state 1. The $\overline{Q}$ output is set to 0 and feedback to flip-flop 5.1 serves to keep gate 5.2 open until the next 100/0 pulse initiates the subsequent multiple count.

In the event of coincident signal and reference pulses, no count is required. To ascertain this condition, signal pulses from gate 5.2 are fed, by way of inventer 41, to one input of a gate 9.1 of coincidence window 9. Reference pulses are fed to the other input of gate 9.1. In the event of coincident signal and reference pulses, the output pulse of gate 9.1 sets a monostable multivibrator 9.2 to $\bar{Q}$ output 0 thereby disabling all gates 11.2, 16 and 17.

Signal pulses passing through the first cycle select unit 5, by way of gate 41, are fed to signal delay unit 8. This unit comprises consecutive monostable multivibrators 8.1 and 8.2. Capacitor 8.3 of multivibrator 8.1 sets the delay of the signal pulses at Q and $\bar{Q}$ output terminals 8' and 8", respectively, and capacitor 8.4 of miltivibrator 8.2 sets the width of the signal output pulses.

Reference pulses are fed to a similar delay unit 10 comprising consecutive monostable multivibrators 10.1 and 10.2. Capacitor 10.3 sets an equal delay as capacitor 8.3 and capacitor 10.4 similarly sets the pulse width of the output reference pulses at Q and $\bar{Q}$ output terminals 10' and 10", respectively.

Gate 39, preceding reference delay unit 10, removes the zero pulse from the input.

Negative logic delayed signal pulses, at terminal 8", and negative logic delayed reference pulses, at terminal 10", are fed to a first gate 11.1 of gates unit 11 and, if the second gate 11.2 of the unit is not disabled by a negative logic coincidence pulse at terminal 9', both signal and reference pulses pass to flip-flop 12. Flip-flop 12, with flip-flop 19, it will be recalled, together define the four-states of the four-state gate.

Flip-flop 12 is preset to Q output 1 by an earlier preset timing pulse on the preset terminal from 84 pulse terminal 21. The first pulse arriving at flip-flop 12 (which the first cycle select unit 5 ensures is a signal pulse) triggers the flip-flop 12 to Q output 0, $\bar{Q}$ output 1.

The positive delayed signal pulse, at terminal 8', is supplied to gate 16. As flip-flop 12 Q output is 1, the signal pulse passes gate 16 to trigger flip-flop 19 Q output to 1. As flip-flops 12, 19 form a reversible counter, the first signal pulse changes the state of the four-state gate from state 1 to state 2.

The next following positive delayed reference pulse, at terminal 10', is supplied to gate 17. Since flip-flop 12 $\bar{Q}$ output is 1, preset by the preceding signal pulse, gate 17 is enabled and the reference pulse sets flip-flop 19 to Q output back to 0, that is resets the four-state gate to state 1.

Figure 6:
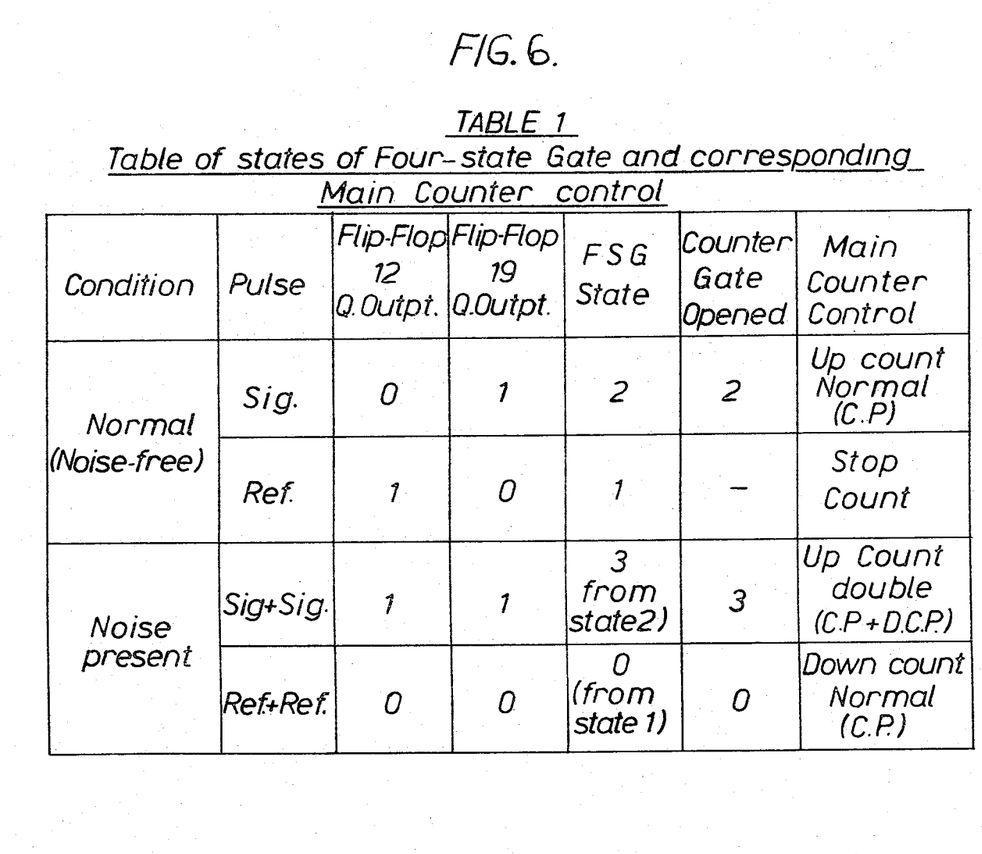
FIG. 6 is a table illustrating the operation of certain elements of the disclosed circuit.

As previously stated, in the absence of signal noise, each signal pulse sets the four-state gate to state 2 which, see Table I, corresponds to counting UP at normal (clock pulse) rate. Each reference pulse sets the four-state gate back to state 1 which is STOP COUNT.

The four-state gate flip-flops 12 and 19 enable one gate, and one gate only at a time, of gates 25, 26 and 27. State 1 causes no change, state 2 enables 2 gate 26.

One input of all gates 25, 26 and 27 receives an 82 stop count pulse on terminal 20 which disables all gates at the end of each 82 count multiple count period. For the duration of each 82 cycle count, state 2 permits of counting, that is summation of successive one-cycle counts, by the main counter 35.

Main counter 35 is a reversible counter. The supply of counting pulses to counter 35 is to terminal 32. Gates 29 control the rate of counting and whether the counting is forward (UP) or reverse (DOWN).

Clock pulses from terminal 31 have a route to terminal 32 by way of gates 29.2 and 29.3 when these gates are enabled. Delayed clock pulses from terminal 30 have a route to terminal 32 by way of gates 29.1, 29.2, and 29.3, when all enabled.

The 2 gate 26 and 3 gate 25 supply an UP count control signal to main counter input terminal 33 and to gate 29.4. The 0 gate 27 supplies a DOWN count control signal to terminal 34 and to gate 29.4.

A gate 43 is enabled by an 82 pulse at terminal 20 and disables all gates 25, 26 and 27 for the duration of both signal pulses and reference pulses so that, when four-state gates 12 and 19 or gates 25, 26 and 27 are changing state, spurious pulses are avoided.

When gate 43 is enabled, its output forms one input to all gates 25, 26, 27 and 29.1 and to a further gate 44.

Gate 29.1 has further inputs from four-state gate flip-flop 12 and 19 Q outputs and delayed clock pulses from terminal 30. Flip-flop 12 and 19 Q outputs 1, representative of state 3 (Table I) enable gate 29.1 when the delayed clock pulses will also pass gate 29.2. Thus gate 29.2 allows delayed clock pulses, clock pulses, or both to pass to gate 29.3 as positive pulses. Other inputs to gate 29.3 are 82 timing pulses from terminal 20, initiating an 82 cycle multiple count period, and the output of gate 29.4.

Gate 29.4 has inputs from all gates 25, 26 and 27 and gate 29.4 output is high for four-state gate states 0, 2 and 3, so that clock pulses are passed through gate 29.3 for these states but not for state 1. Additionally, the delayed clock pulses pass during state 3 making a double-rate count.

Considering, now, the noise-free states 2 and 1, state 2, corresponding to four-state flip-flop 12 and 19 Q outputs 0 and 1, respectively, opens 2 gate 26 and opens gates 29.2 and 29.3 to permit the forward counting of clock pulses. State 1, corresponding to four-state flip-flop 12 and 19 Q outputs 1 and 0, respectively, disables gate 29.3.

Reference to Example (a) of FIG. 4 has shown how random noise on the incoming signal may result in two successive signal pulses. This event, see Table I, results in both four-state flip-flop 12 and 19 Q outputs changing to state 1, corresponding to state 3 of the four-state gate, (unless the two signal pulses are preceded by two reference pulses in succession). In this condition, all of gates 29.1, 29.2, 29.3 and 29.4 are enabled to permit of forward counting of both clock pulses and the inter-digitated delayed clock pulses.

Example (b) of FIG. 4 has shown how, under noisy signal conditions, two reference pulses may occur in succession. This event, see Table I, results in both four-state flip-flop 12 and 19 $\bar{Q}$ outputs changing to 1, (unless the two reference pulses are preceded by two signal pulses). In this condition, 0 gate 27 is enabled with gates 29.2, 29.3 and 29.4 to cause reverse counting of clock pulses.

Two further control units, not shown in FIG. 1, are included in the arrangement shown in FIG. 3. These are a data available unit 45 and a no signal disable unit 46.

Data available unit 45 comprises set and reset gates 45.1 and 45.2 cross connected so that when one is enabled the other is disabled.

A gate 42 is enabled by a Q output state from flip-flop 5.3 and is disabled by an 84 pulse at terminal 21 or an output from no signal disable unit 46, next to be described. Gate 45.1 is set by a pulse from gate 42 at time 84 and is reset by an 82 pulse at terminal 20 being applied to reset gate 45.2. A "data-available" output pulse from gate 45.1 is supplied directly to the counter 35 at terminal 47.

The no signal disable unit 46 is provided to detect false working of the four-state gate, as indicated by the occurrence of both states 0 and 3 in the same counting sequence, representing a confusion of the conditions of Example (a) and Example (b) of FIG. 4.

False working involving the occurrence of both states 0 and 3 may result if either signal or reference pulses drift from the nominal 1 kH frequency, resulting in an extra pulse of one or the other pulse during a multiple counting period, or if there is a failure of either signal pulse or reference pulse channel.

No signal disable unit is preceded by a gate 44, which has an enabling input from gate 43 and enabling inputs from flip-flop 12 and 19 Q outputs. The no signal disable unit 46 comprises flip-flops 46.1 and 46.3 and an intermediate gate 46.2. Gate 46.2 has inputs from flip-flop 46.1 and from 0 gate 27. The output of 46.2 is fed to flip-flop 46.3.

Flip-flops 46.1 and 46.2 will operate if a 0 state and 3 state occur in the same 82 multiple count period. Thus, flip-flop $\bar{Q}$ output goes to 0.

As explained above, the multiple counting period, providing for the summation by counter 35 of 82 individual counts of phase difference, is arbitrarily chosen in the arrangement of FIG. 3.

Figure 5:
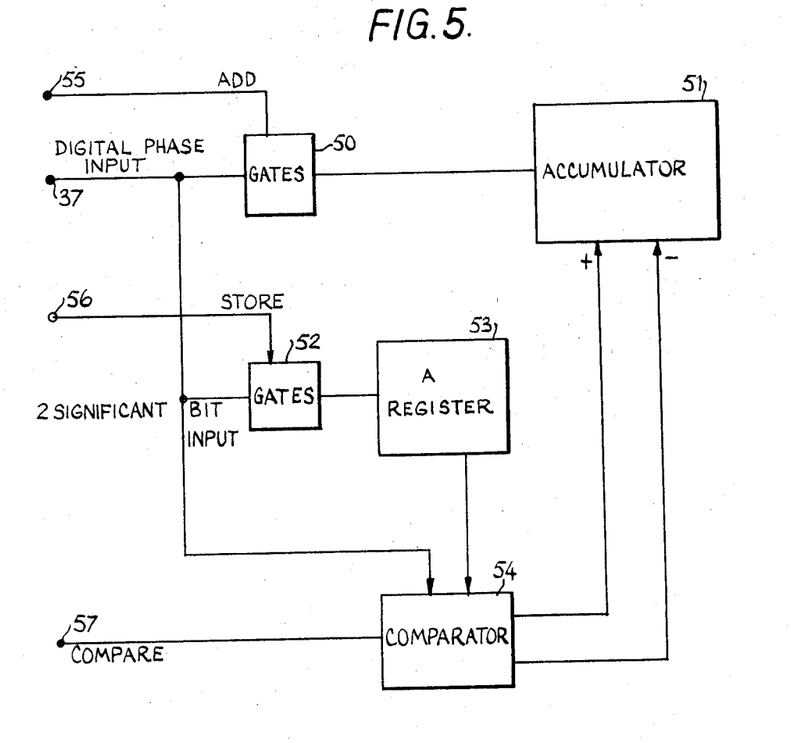
FIG. 5 is a block diagram of units included in a second embodiment of the invention.

The arrangement of FIG. 5 provides for extending the counting over a longer period.

The arrangement of FIG. 5 has terminal 37 of the arrangement of FIG. 3 as its input terminal. The digital input from terminal 37 is supplied to gate 50, a two significant bits store by way of gates 52 and a comparator 54. Store gates 52 feeds a store 53, which supplies comparator 54. Gates 50 feeds an accumulator 51, which also receives a positive or a negative input from comparator 54.

The binary digital phase count at terminal 37 is fed into accumulator 51. At the same time, two significant bits of the count are stored in A-register 53. After admission of the first count, the gates 52 to register 53 are closed to the subsequent counts which are added in to accumulator 51. For each subsequent count, however, the two significant bits are compared, with the two significant bits first entered into register 53, by means of comparator 54.

If, for example, the first count is a high phase count and the next count is a low phase count, the comparator 54 will identify this event and will add a count, which is the equivalent of 360° phase measurement, that is a count of 200 in the present example, to the count in accumulator 51. If a low initial count is followed by a high count, the comparator 54 effects a subtraction of a count of 200 from accumulator 51.

Timing pulses for controlling the adding of counts into accumulator 51, the entering of initial data into register 53 and the comparison of two significant bits of the initial count with those of subsequent counts are derived from terminals 55, 56 and 57.

I claim:

1. A circuit arrangement for providing a digital measurement of the instantaneous phase difference between first and second recurrent signals including a generator of clock pulses of a higher order of frequency than the repetition frequency of the said recurrent signals, first means for examining the first and second signals in pulse form to identify corresponding pulse parts of pairs of successive first and second signal pulses thus identifying the intervals therebetween and second means for counting the number of clock pulses occurring in each said interval and summing the said count over a number of said intervals, said second means including means for maintaining the clock pulse count for said number of said intervals, for conditions of near-coincidence of said successive pulses, either uniformly high or uniformly low.

2. A circuit arrangement as claimed in claim 1, wherein at least one of said first and second signals is in sinusoidal form, including wave-shaping means for converting said signal into pulse form.

3. A circuit arrangement as claimed in claim 1, wherein said first means identifies the pulse wave fronts of said first and second signals.

4. A circuit arrangement as claimed in claim 1 wherein said second means includes gate means responsive to the occurrence of two successive ones of either of said first and second signals for altering the counting of said clock pulses.

5. A circuit arrangement as claimed in claim 4 wherein one of said first and second signals initiates said counting of said clock pulses and said gate means comprises means responsive to the occurrence of two successive ones of said counting initiating signals for initiating upward counting of said clock pulses at a rate which is twice the normal counting rate.

6. A circuit arrangement as claimed in claim 4 where one of said first and second signals terminates said counting of said clock pulses and said gate means comprises means responsive to the occurrence of two successive ones of said count terminating signals for initiating downward counting of said clock pulses.

7. A circuit arrangement for providing a digital measurement of the instantaneous phase difference between first and second recurrent signals including a generator of clock pulses of a higher order of frequency than the repetition frequency of the said recurrent signals, first means for examining the first and second signals in pulse form to identify corresponding pulse parts of pairs of successive first and second signal pulses thus identifying the intervals therebetween and second means for measuring the number of clock pulses occurring in each said interval and summing the said count over a number of said intervals, so that said clock pulse count for said number of said intervals, for conditions of near coincidence of said successive pulses, is kept either uniformly high or uniformly low, said second means including a four state gate having a first state, determined by only one of said first and second signals, which initiates upward counting of clock pulses; a second state, determined by the other one of said first and second signals, which ends the counting of clock pulses; a third state, determined by two successive count-initiating signals as aforesaid, which initiates upward counting of clock-pulses at double rate; and a fourth state, determined by two successive count-ending signals as aforesaid, which initiates downwards counting of clock pulses.

8. A circuit arrangement as claimed in claim 7, including both a source of clock pulses as aforesaid and a source of delayed clock pulses of the same repetition frequency interdigitated with said clock pulses and wherein said upward counting at double rate is effected by gate means which pass to counting means both the clock pulses and the delayed clock pulses.

9. A circuit arrangement as claimed in claim 7, including first cycle select means, responsive to the presence of the first signal pulse and then locked open to permit the counting of clock pulses additively in the intervals between a plurality of first and second signal pairs.

* * * * *